2,616,763

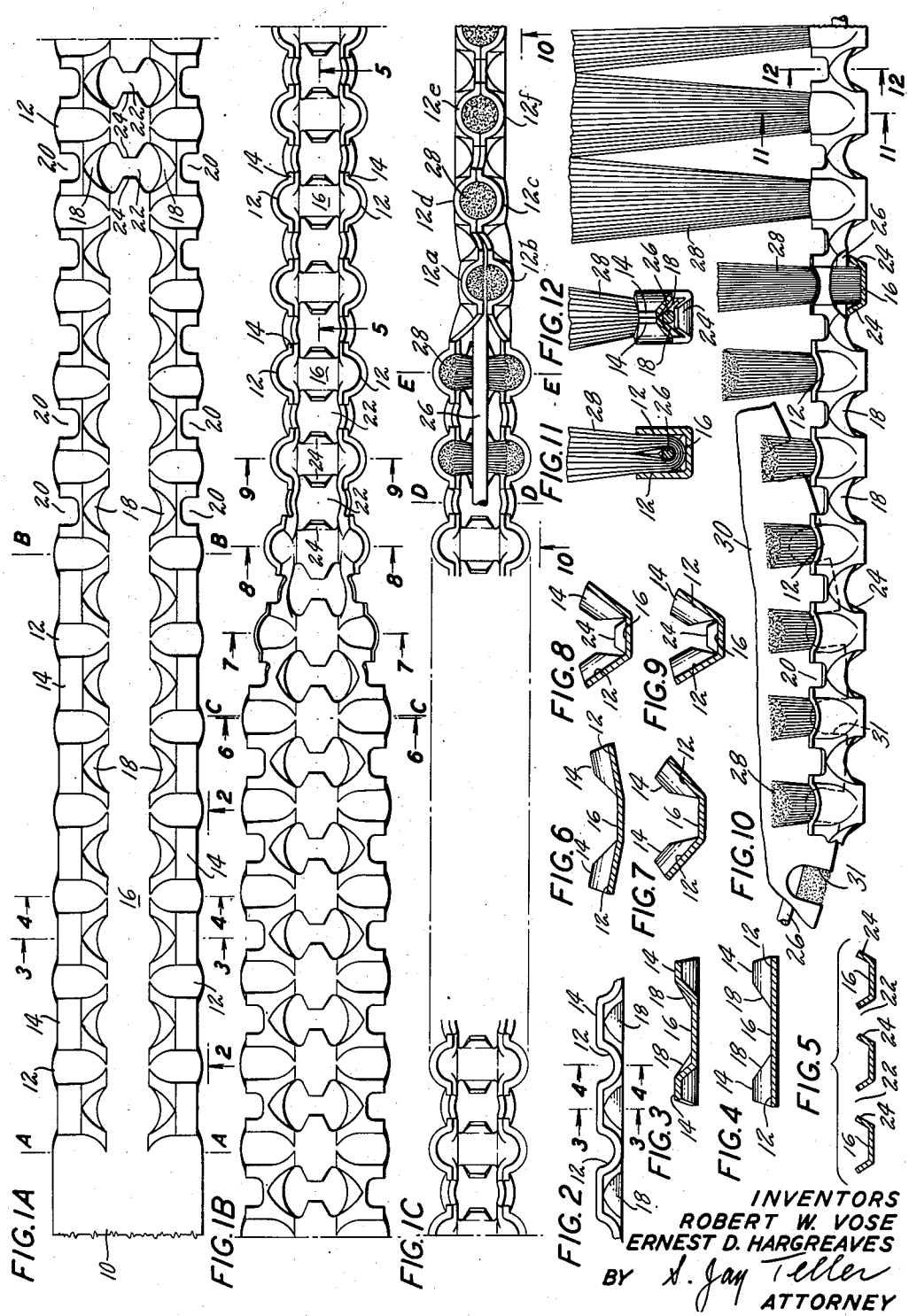

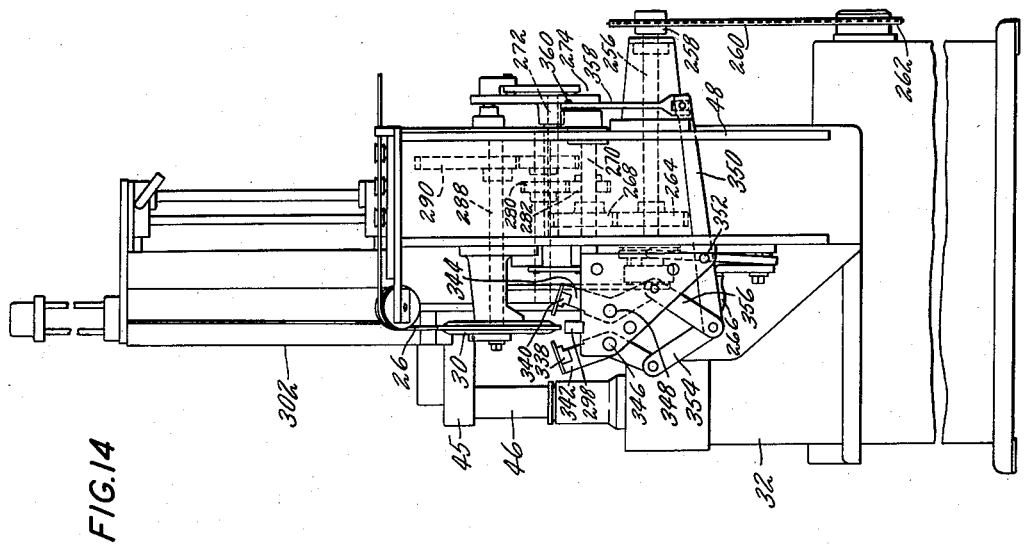

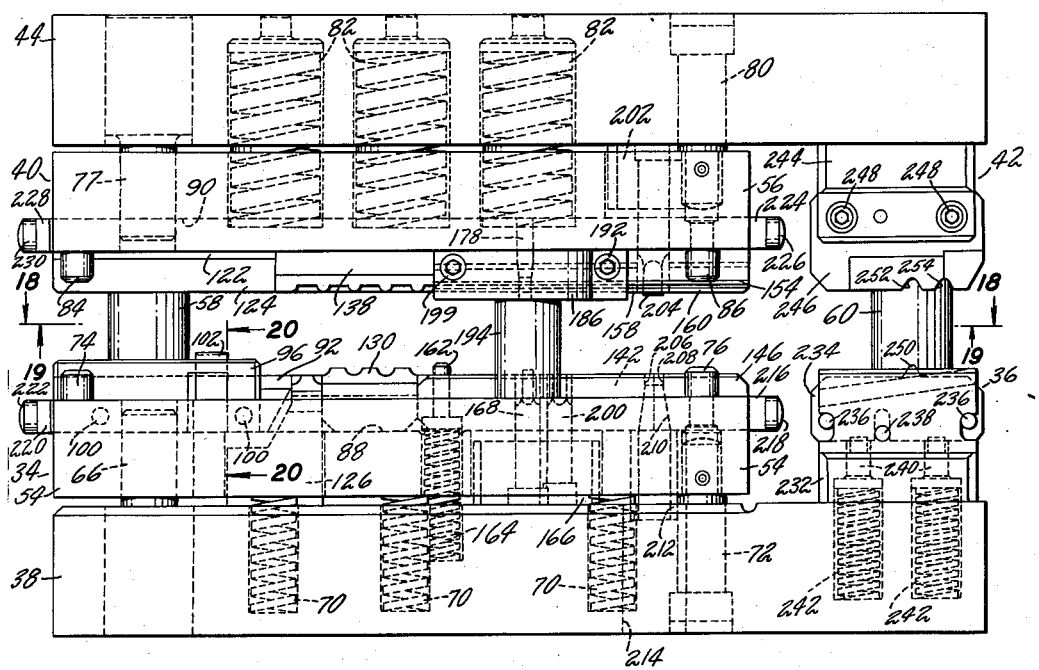
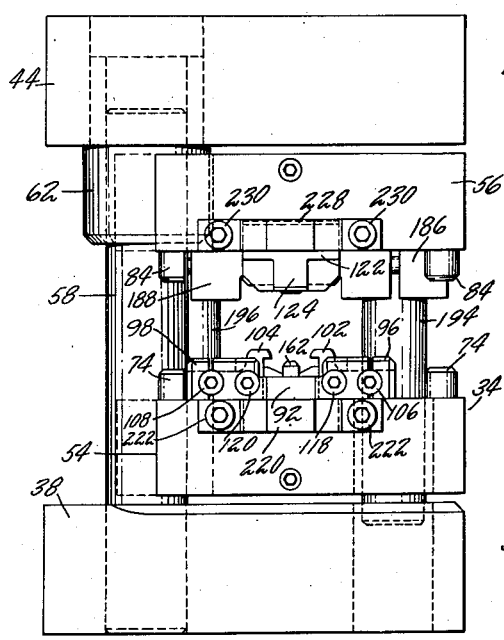
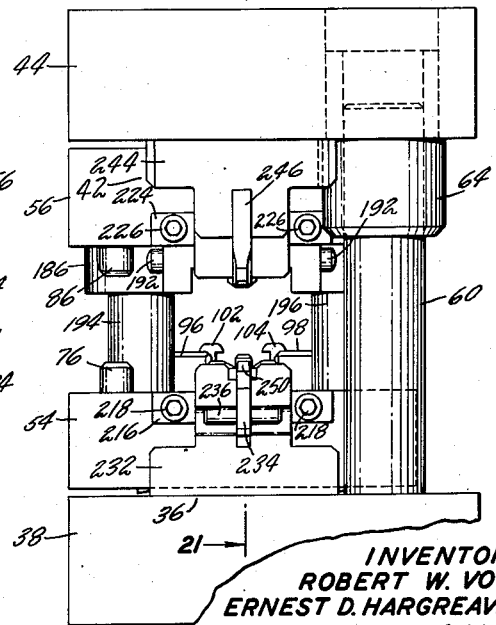

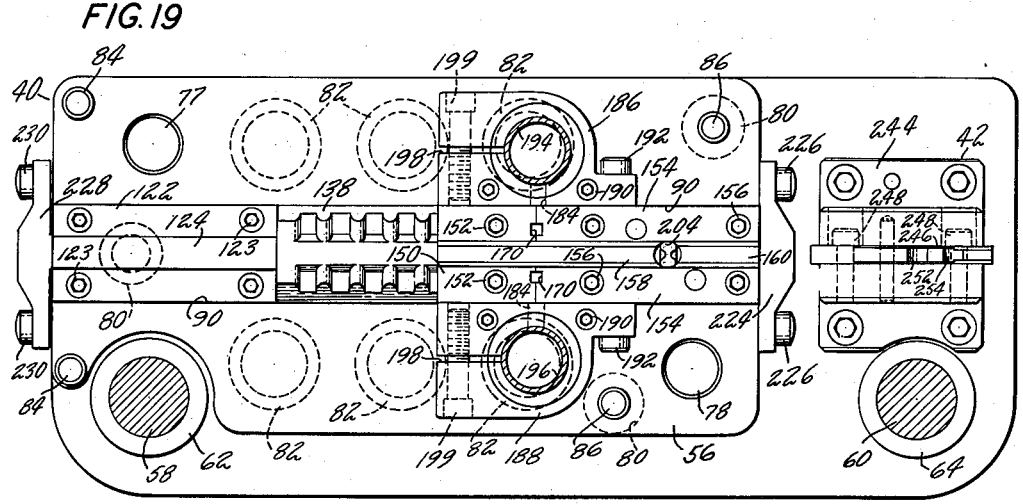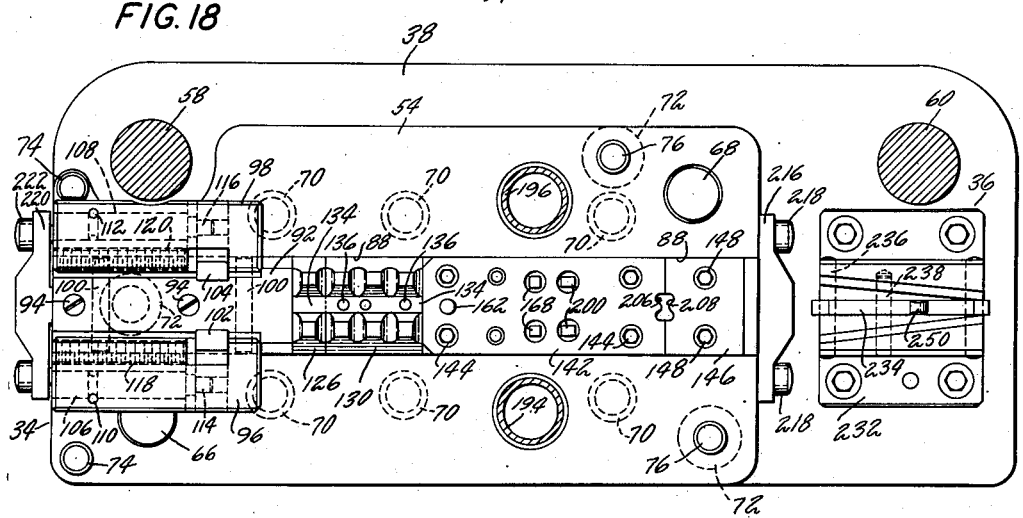

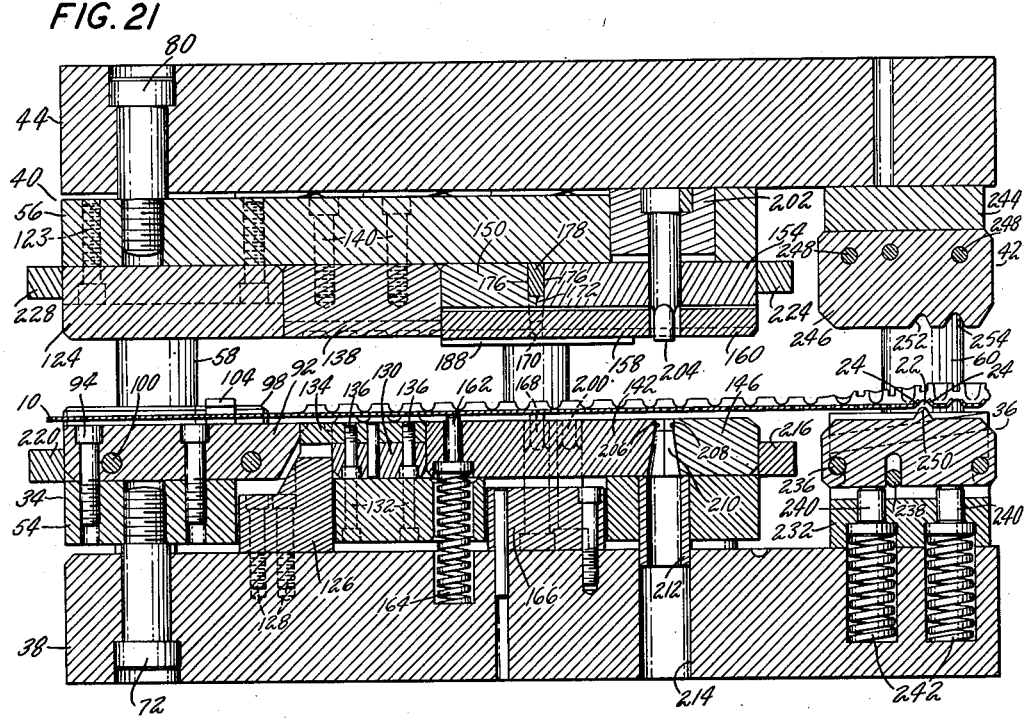

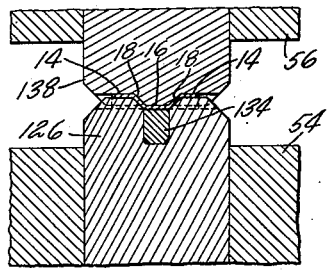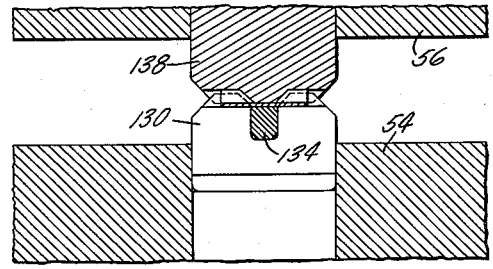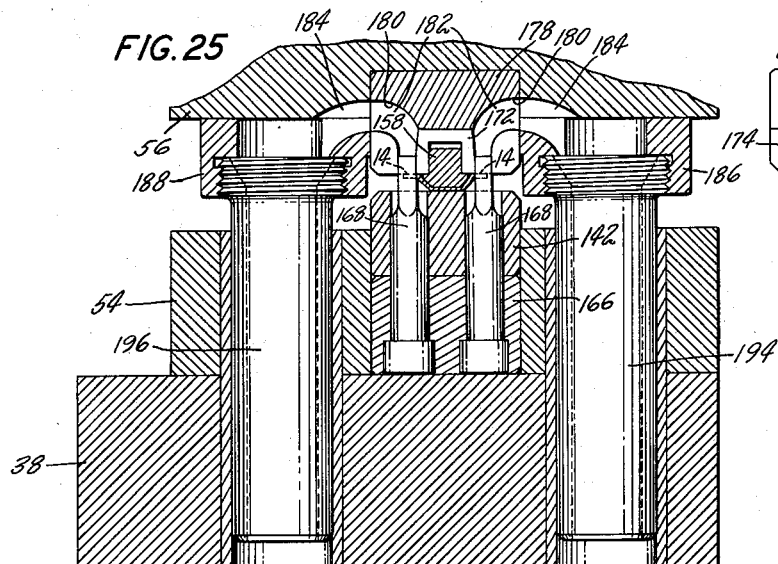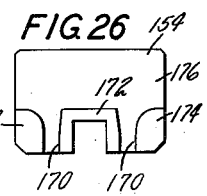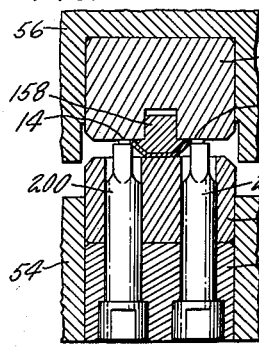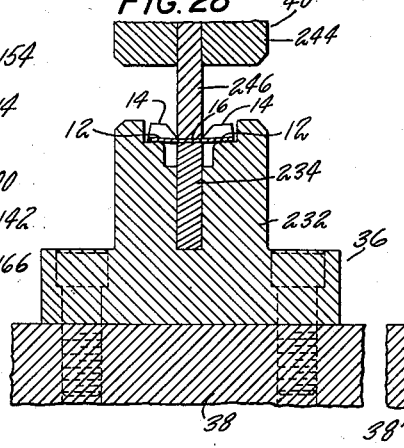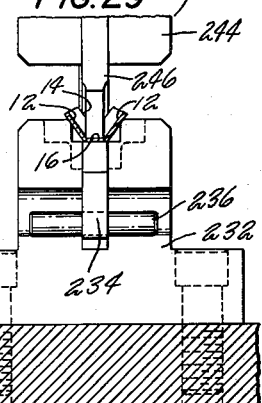

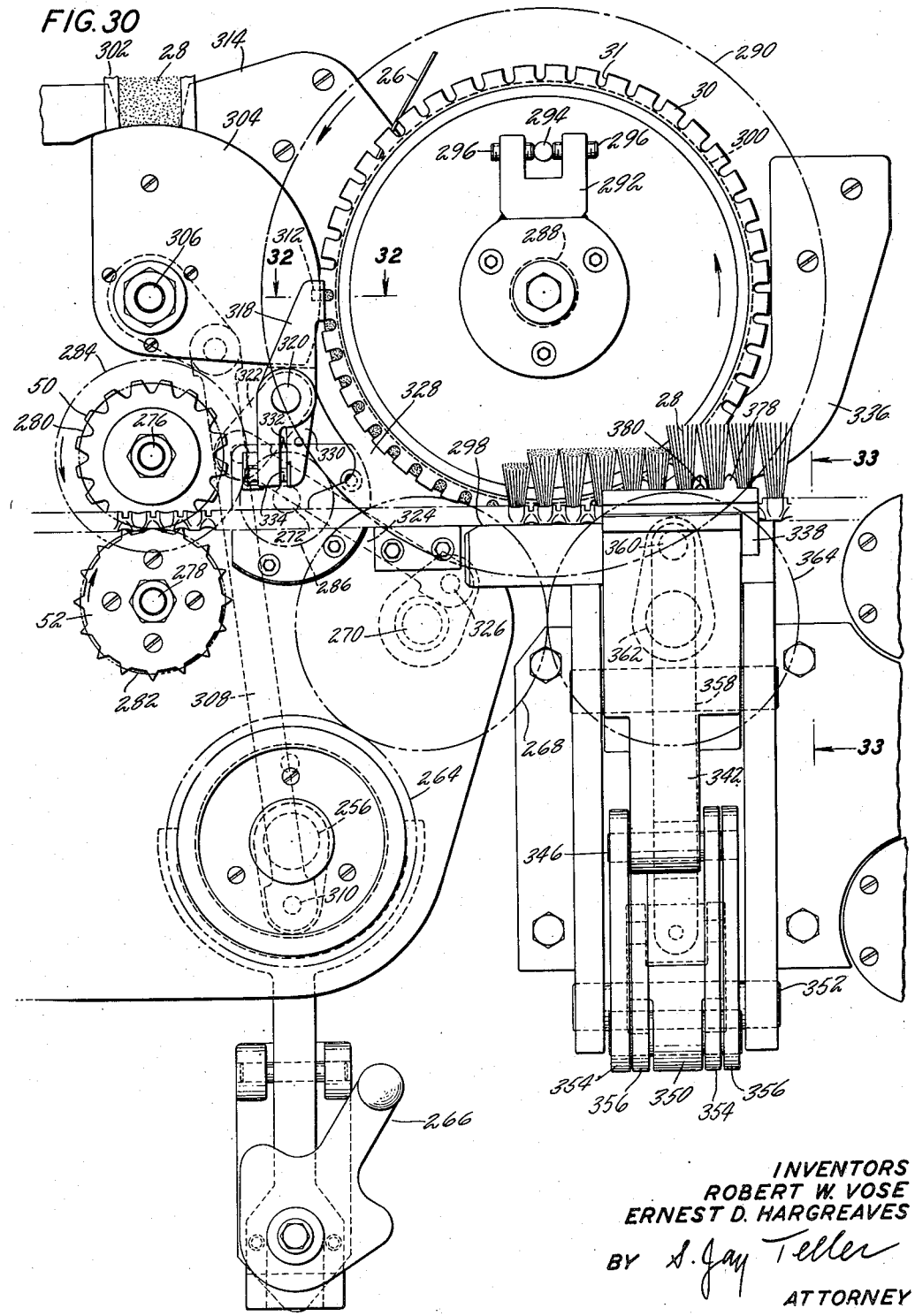

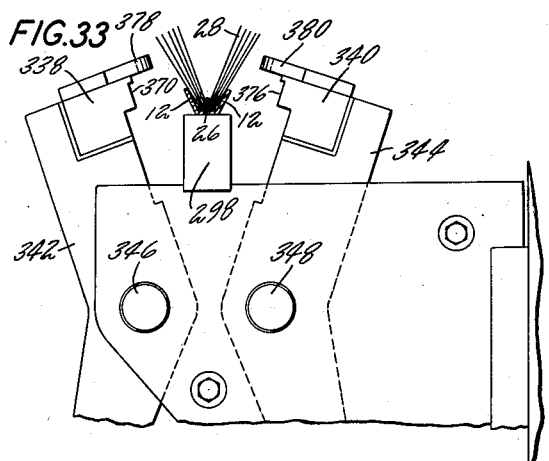
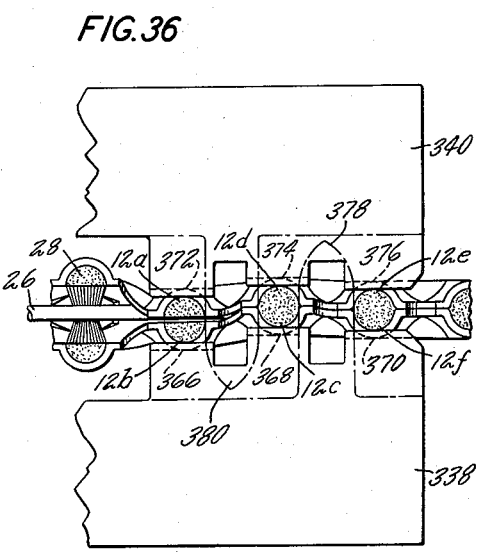
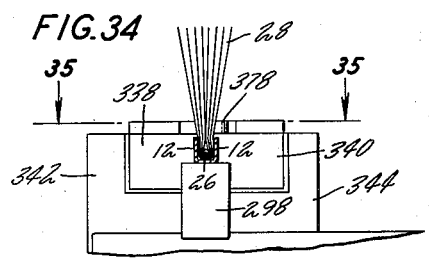
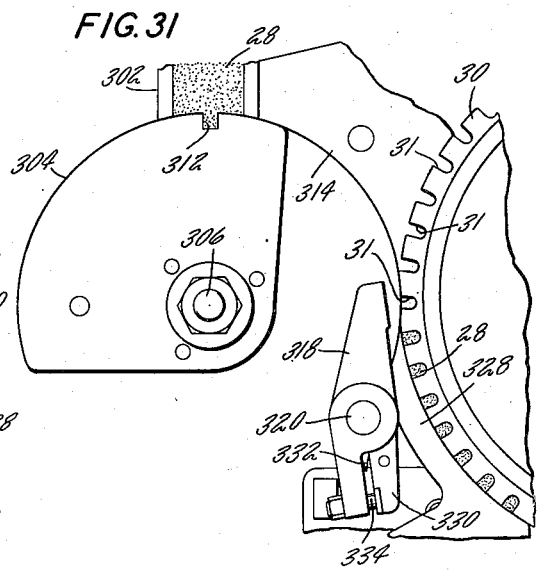
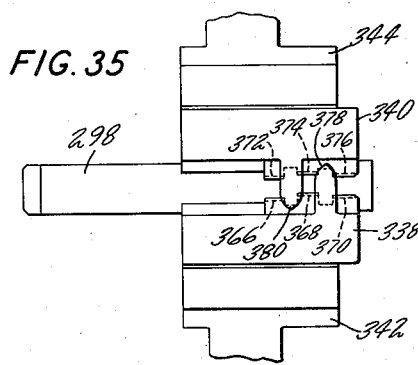
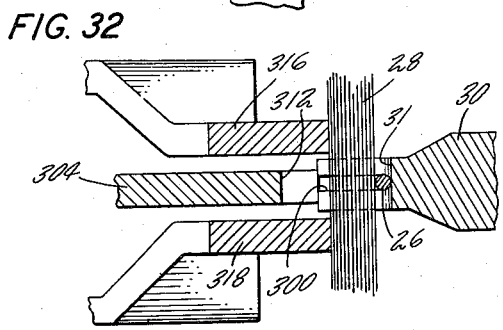
INVENTORS
ROBERT W. VOSE
ERNEST D. HARGREAVES
BY S. Jay Teller
ATTORNEY Patented Nov. 4, 1952

UNITED STATES PATENT OFFICE 2,616,763

METHOD AND MACHINE FOR MAKING A BRUSH ELEMENT OF THE STRIP TYPE

Robert W. Vose, West Springfield, and Ernest D. Hargreaves, Springfield, Mass., assignors to The Fuller Brush Company, Hartford, Conn., a corporation of Connecticut Application March 22, 1950, Serial No. 151,118

35 Claims. (Cl. 300—21)

The present invention relates to a method and a machine for making a brush element of the strip type and more particularly a brush element such as disclosed in the copending application of Alfred L. Le Febvre, Robert W. Vose and Ernest D. Hargreaves for Brush Element of the Strip Type, Serial No. 93,942 filed May 18, 1949.

With respect to the method, the principal object of the invention is to provide a succession of steps for making a brush element of the type set forth in the said copending application. More specifically the method comprises a combination of steps wherein a metallic strip is moved longitudinally through a series of zones and is acted upon in the several zones to form the strip at the side portions thereof so as to provide oppositely disposed socket sections, to cut notches and holes in the strip in proper relationship to the socket sections, to bend the strip along longitudinal lines to provide an open-front channel, to feed wire and spaced bunches of fibers into the channel of the strip, and finally to additionally bend the strip along longitudinal lines to bring the opposed socket sections into engagement with each other with the bunches of fibers folded within the socket sections and projecting forwardly therefrom to constitute tufts.

With respect to the machine, the principal object of the invention is to provide a series of mechanisms connected and coordinated to perform a series of successive operations which result in a brush element of the type disclosed in the said copending application.

A more specific object of the invention is to provide in combination, means for intermittently feeding an initially flat strip longitudinally, means for forming the strip at the side portions thereof to provide socket sections, means for cutting notches and holes in the strip, means for bending the strip along longitudinal lines to provide an open-front channel, means for feeding wire and spaced bunches of fibers into the channel of the strip, and means for additionally bending the strip along longitudinal lines to completely fold the fibers and to form complete sockets.

Further objects of the invention are to provide various novel and advantageous devices and structures constituting the several means referred to in the last preceding paragraph.

Still other objects of the invention will be apparent from the drawings and from the following description and claims.

The drawings show a presently preferred machine adapted for practicing the method of the invention and embodying the mechanical features thereof. It will be understood, however, that various changes may be made from the construction shown, and that the drawings are not to be construed as defining or limiting the scope of the invention, the claims forming a part of this specification being relied upon for that purpose.

Of the drawings:

Figs. 1A, 1B and 1C are plan views showing successive steps in the manufacture of a brush element in accordance with the method of the invention.

Fig. 2 is a fragmentary side view taken in the direction of the arrows 2, 2 of Fig. 1A.

Figs. 3 and 4 are transverse sectional views taken respectively along the lines 3—3 and 4—4 of Figs. 1A and 2.

Fig. 5 is a fragmentary longitudinal sectional view taken along the line 5—5 of Fig. 1B.

Figs. 6 to 9 are transverse sectional views taken respectively along the lines 6—6, 7—7, 8—8 and 9—9 of Fig. 1B.

Fig. 10 is a fragmentary side view taken in the direction of the arrows 10, 10 of Fig. 1C, this view also showing a portion of the machine.

Figs. 11 and 12 are transverse sectional views taken respectively along the lines 11—11 and 12—12 of Fig. 10.

Fig. 13 is a front view of a machine embodying the mechanical features of the invention and adapted for practicing the method of the invention.

Fig. 14 is a right end view.

Fig. 15 is an enlarged side view of the strip forming and punching mechanism shown in the upper left portion of Fig. 13.

Figs. 16 and 17 are respectively left and right end views of the mechanism shown in Fig. 15.

Fig. 18 is a view looking downward in the direction of the arrows 18, 18 of Fig. 15.

Fig. 19 is a view looking upward in the direction of the arrows 19, 19 of Fig. 15.

Fig. 20 is a fragmentary transverse vertical sectional view taken along the line 20—20 of Fig. 15.

Fig. 21 is a vertical longitudinal sectional view taken along the line 21—21 of Fig. 17.

Fig. 22 is a view similar to Fig. 21 but with the parts in different relative positions.

Figs. 23 and 24 are enlarged fragmentary transverse sectional views taken respectively along the lines 23—23 and 24—24 of Fig. 22.

Fig. 25 is a fragmentary transverse vertical sectional view taken along the line 25—25 of Fig. 22.

Fig. 26 is an end view of one of the parts shown in Fig. 25.

Fig. 27 is a fragmentary transverse vertical sectional view taken along the line 27—27 of Fig. 22.

Figs. 28 and 29 are fragmentary transverse sectional views taken respectively along the lines 28—28 and 29—29 of Fig. 22.

Fig. 30 is an enlarged partly diagrammatic side view of the mechanism, as shown in the right portion of Fig. 13, for assembling fibers and a core wire with the punched and partly formed strip and for completing the brush element.

Fig. 31 is a fragmentary view similar to Fig. 30, but showing some of the parts in different relative positions.

Fig. 32 is an enlarged fragmentary sectional view taken along the line 32—32 of Fig. 30.

Fig. 33 is an enlarged fragmentary right end view taken along the line 33—33 of Fig. 30.

Fig. 34 is a fragmentary view similar to Fig. 33 but showing the parts in different relative positions.

Fig. 35 is an enlarged fragmentary plan view taken along the line 35—35 of Fig. 34.

Fig. 36 is an enlarged view, partly diagrammatic, showing the action of the bending jaws to bend the strip as shown in the right portion of Fig. 1C.

Method

Figs. 1A to 12 of the drawings show successive steps in the making of a brush element in accordance with the invention. An initially flat metallic strip 10 is provided which is preferably horizontal, the said strip being longitudinally moved, for instance toward the right, through a series of successive zones. The strip is acted upon within the said zones as hereinafter described.

Within the first zone at the right of the line A—A in Fig. 1A, the strip is engaged by suitable shaping or forming tools and the side portions of the strip are thereby shaped or formed to provide longitudinally spaced pairs of oppositely disposed transversely extending concave socket sections 12, 12. The strip is preferably moved intermittently, each step of movement being equal to the spacing between each two adjacent pairs of socket sections. The said spacing between adjacent pairs of socket sections is sometimes herein referred to as the "longitudinal spacing." The shaping or forming of the socket sections 12, 12 provides pairs of oppositely disposed upwardly offset sections 14, 14 which are between the pairs of socket sections. The central portion 16 of the strip remains flat and the bottoms of the socket sections are in the same plane as the said central portion 16.

The said offset sections 14, 14 are connected with the said central portion 16 by angularly disposed portions 18, 18. Preferably the portions 16, 18 are oppositely inclined at angles of approximately 45°. The said portions 18, 18 are preferably so shaped or formed that they are slightly concave or inversely arched, the extent of arching decreasing in the transversely outward directions.

At a zone at the right of the line B—B in Fig. 1A and in the leading direction from the first said zone, the strip is acted upon by two sets of cutting or punching tools. These tools preferably, but not necessarily, act at different positions or stations within the zone. One set of tools cuts or punches pairs of notches 20, 20 in the offset sections 14, 14, these notches extending inward from the sides of the said sections 14, 14 approximately to the outer edges of the angularly disposed portions 18, 18. The other set of tools cuts or punches central holes 22, 22 in the central portion 16. The said holes 22, 22 are in transverse register with the notches 20, 20 and they preferably have concave outer edges which are approximately at the inner edges of the angularly disposed portions 18, 18. Thus the notches and the holes leave the angularly disposed portions 18, 18 as the sole portions which connect the successive socket portions with each other.

Preferably the holes 22 are shaped as shown to provide tabs 24, 24 which extend longitudinally and oppositely into the said holes. The tabs 24, 24 are subsequently bent upwardly as shown in Fig. 5. The tabs may be bent immediately following the punching of the holes, but preferably the bending is effected during a subsequent operation as will be described.

At a zone at the right of the line C—C in Fig. 1B and in the leading direction from the last preceding zone, the strip is bent upwardly along longitudinal lines to provide an open-front channel with the socket portions 12, 12 and the offset portions 14, 14 constituting the side walls of the channel and with the central portion 16 constituting the rear or bottom wall thereof. Preferably the bending takes place progressively or in stages, as shown in Figs. 6 to 9. At the completion of bending, the side walls diverge as shown in Fig. 9. Preferably the beforementioned upward bending of the tabs 24, 24 is effected simultaneously with one of the bending stages.

At a zone at the right of the line D—D in Fig. 1C and in the leading direction from the last preceding zone, a longitudinal wire 26 and longitudinally spaced bunches 28, 28 of transverse fibers are fed downwardly into the channel, the bunches of fibers being below the wire. Preferably the wire and the bunches of fibers are guided by means such as a wheel 30 as shown in Fig. 10. The bunches of fibers are spaced in accordance with the spacing of the socket sections, and notches 31, 31 are provided in the wheel 30 for this purpose. When the strip is advanced intermittently as is preferred, the wire and the bunches of fibers are also moved intermittently and at the same rate. The said wire and the said bunches are fed at an angle by the said wheel 30 so that the wire is positioned between the side walls of the channel and near the rear wall thereof. Preferably the wire engages the front edges of the upwardly bent tabs 24, 24. As the result of the said positioning of the wire within the channel, the bunches of fibers are partly folded into the successive socket sections 12, 12 as shown in Fig. 10.

At a zone at the right of the line E—E in Fig. 1C and in the leading direction from the last preceding zone, the strip is additionally bent along longitudinal lines to additionally fold the bunches of fibers and to bring the said angularly disposed connecting portions 18, 18 of the strip above the wire 26 as clearly shown in Fig. 12. At the same time the offset sections 14, 14 of successive pairs are brought into engagement with each other and the socket sections 12, 12 of successive pairs form complete sockets. The successive bunches of fibers are looped around the wire 26 and they are positioned within the respective sockets and project forward therefrom to constitute tufts.

The location of the wire 26 behind or below the angularly disposed connecting portions locks the wire and the bunches of fibers to prevent any forward or upward movement thereof. The opposite inclinations of the connecting portions serve to hold the wire in central position. As shown in Fig. 10 the inner looped portion of each bunch of fibers 28 is between two of the upwardly bent tabs 24, 24. The tabs thus serve to prevent the said inner portion of the bunch of fibers from moving longitudinally along the wire 26.

Preferably the two sides of the channel are bent fully inward successively rather than simultaneously. As shown in the right portion of Fig. 1C, each successive socket section in the position 12ª at one side, as at the rear, is moved inwardly or forwardly beyond the central plane, and at the same time each successive opposite socket section in the position 12ᵇ is preferably moved inwardly or rearwardly to some extent but not sufficiently to bringing the two socket sections into engagement. At the next following position, that is, at a leading portion of the same zone, each successive socket section in the position 12ᶜ at the opposite side, as at the front, is moved inwardly or rearwardly at least to the central plane carrying with it the opposite rear socket section at the position 12ᵈ. The two socket sections and the corresponding offset sections 14, 14 are thus firmly engaged. The socket section in the position 12ᵇ is preferably moved somewhat beyond the central plane as shown. The resiliency of the metal tends to move the engaged socket sections so that their plane of contact is at the central plane when the next following position is reached as shown at 12ᵉ and 12ᶠ, but if necessary force may be applied to so move the said socket sections.

From the foregoing description it will be seen that as the initially flat strip 10 is intermittently moved, it is successively acted upon and that by a succession of steps a continuous tufted brush element is formed.

*General organization of machine*

Figs. 13 and 14 of the drawings show a machine embodying the mechanical features of the invention and adapted for practicing the method of the invention. Various details of the machine are shown in Figs. 15 to 36.

A strip such as the before mentioned strip 10 is moved through the machine, preferably from left to right. The movement of the strip is preferably intermittent, each movement being equal to the before-mentioned longitudinal spacing. The machine comprises a main base or frame 32 on which are supported means for acting upon the strip 10 to form longitudinally spaced offset sections and socket sections at the side portions thereof and preferably also to cut or punch notches and holes therein as previously described. Preferably and as shown the last said means comprises relatively reciprocating dies at opposite sides of the strip. Also supported on the base or frame 32 is a means for acting on the strip to bend it upwardly along longitudinal lines to provide an open-front channel. Preferably and as shown, the said channel forming means preferably also comprises relatively reciprocating dies at opposite sides of the strip. The strip 10 is initially flat and it is preferably horizontal, the relatively reciprocating dies being respectively above and below the path of movement of the strip. It will be understood that, in many instances terms such as "horizontal," "vertical," "above," "below" and the like are herein used merely for convenience of description and do not necessarily serve to limit the scope of the invention.

In the preferred embodiment of the invention as shown, there are two lower dies indicated generally at 34 and 36, these dies including a common fixed lower plate 38 on the frame 32. There are two upper dies indicated generally at 40 and 42, these dies including a common vertically reciprocable upper plate 44 secured to a platen 45. The platen 45 is connected with vertical bars 46, 46 which extend downward into the frame 32. By means of suitable mechanism within the frame the bars 46, 46 and the platen 45 and the various parts carried thereby are vertically reciprocated at a relatively rapid rate. The mechanism for reciprocating the bars 46, 46 and the platen 45 is not shown, and it may be of any usual or preferred construction. As the strip 10 is intermittently moved longitudinally between the relatively reciprocating lower and upper dies 34 and 40, it is formed and cut after each intermittent movement in the manner to be described in detail. As the strip is intermittently moved longitudinally between the relatively reciprocating lower and upper dies 36 and 42 it is bent upwardly along longitudinal lines to provide an open-front channel.

Connected with the base or frame 32 is a bracket 48 carrying various mechanisms which will be hereinafter described in detail. The said mechanisms include two oppositely disposed wheels 50 and 52 between which the strip 10 passes after having been acted upon by the dies 34, 36 and 40, 42. The wheels are intermittently rotated in the directions of the arrows in Fig. 13 and in timed relation to the reciprocation of the upper dies 40, 42. The engagement of the wheels 50 and 52 with the strip is such that they impart the required intermittent longitudinal movement to the strip. The strip is moved longitudinally to the extent of the said longitudinal spacing while the upper dies 40 and 42 are out of engagement with the strip, movement of the strip being stopped when the said dies 40 and 42 move downward to engage it. It will be seen that the dies for forming and cutting the strip and for bending it to provide the open-front channel are at the trailing side of the feeding means.

The before-mentioned wheel 30 for feeding the wire 26 and for feeding the fiber bunches 28, 28 is also carried by the bracket 48. The said wheel serves in conjunction with other parts to be described in detail to feed the wire and the bunches of fibers into the channel of the strip, the said bunches of fibers being partly folded. The said wheel 30 is at the leading side of the wheels 50 and 52 which feed the strip. Also carried by the bracket 48 and at the leading side of the wheel 30 are devices, hereinafter described in detail, for additionally bending the strip along longitudinal lines to bring the socket sections of successive pairs into closed relationship and to cause the complete folding of the bunches of fibers.

*Forming and punching dies*

The lower dies 34, 36 and the upper dies 40 and 42 and the various parts directly associated therewith are shown in detail in Figs. 15 to 29.

The lower die 34 includes a shoe 54 connected with the lower plate 38, and the upper die 40 includes a shoe 56 connected with the upper plate 44. The lower plate 38 is provided near the rear thereof with two vertical guide rods 58 and 60 which extend through bearing 62 and 64 carried by the upper plate 44. These rods serve to guide the vertical movements of the upper plate and to prevent any lateral movement thereof.

The lower shoe 54 is vertically movable to a limited extent with respect to the lower plate 38. It is guided for such vertical movement by guide pins 66 and 68 which are carried by the plate and which project upward into and fit bearing apertures in the shoe. The guide pins are shown in Figs. 15 and 18. Coil springs 70, 70 seated in apertures in the plate 38 and in the shoe 54 normally serve to hold the shoe in spaced relationship with the plate, as shown in Figs. 15, 16, 17 and 21. However, when pressure is applied the shoe can move relatively downward in opposition to the springs to engage the plate as shown in Fig. 22. Relative upward movement of the shoe 54 is limited by bolts 72, 72 threaded into the shoe and provided with heads in counterbored apertures in the plate 38. These bolts are shown in Figs. 15, 21 and 22.

The lower shoe 54 is provided with a plurality of buttons 74, 74 and 76, 76 which project upwardly from the upper face thereof. These buttons are adapted and positioned to be engaged by similar buttons on the upper shoe 56. The buttons 76, 76 at the right are shown as mounted in the upper portions of the holes for the corresponding motion limiting bolts 72, 72.

The upper shoe 56 is vertically movable to a limited extent with respect to the upper plate 44. It is guided for such vertical movement by guide pins 77 and 78 which are carried by the plate and which project downward into and fit bearing apertures in the shoe. The guide pins are shown in Figs. 15 and 19. Relative downward movement of the shoe is limited by bolts 80, 80 threaded into the shoe and provided with heads in counterbored apertures in the plate, as shown in Figs. 15, 19, 21 and 22. Soil springs 82, 82 seated in apertures in the plate 44 and in the shoe 56 normally serve to hold the shoe in its lowermost position with respect to the plate 44, as shown in Figs. 15, 16, 17 and 21.

The upper shoe 56 is provided with a plurality of buttons 84, 84 and 86, 86 which project downwardly from the lower face thereof. These buttons are adapted and positioned to engage the similar buttons 74, 74 and 76, 76 on the lower shoe 54. The buttons 86, 86 at the right are shown as mounted in the lower portions of the holes for the corresponding motion limiting bolts 80, 80.

A longitudinal groove 88 is formed in the lower shoe 54, this groove being open at the top and having the cross sectional shape shown in Fig. 20. A similar groove 90 open at the bottom is formed in the upper shoe 56. The two grooves 88 and 90 are in vertical register with each other, and they serve to receive and position various tools to be described.

Located within the lower groove 88 at the left portion thereof is a T-shaped block 92 held in place by screws 94, 94. Front and rear guide blocks 96 and 98 are provided, these blocks being provided with flanges which enter the groove 88 at opposite sides of the stem portion of the T-block 92 as best shown in Fig. 20. Transverse pins 100, 100 extend through apertures in the block 92 and in the said flanges to hold the blocks 96 and 98 in place.

Guided in notches in the respective blocks 96 and 98 for transverse movement are two transversely opposite guides or jaws 102 and 104, which are adapted to engage the edges of the strip 10 to guide the said strip and which have lips which overlie the strip to limit relative upward movement thereof. The jaws 102 and 104 are best shown in Fig. 20. Extending longitudinally through apertures in the blocks 96 and 98 are rotatable shafts 106 and 108 having wrench sockets in their outer ends. Annular grooves are formed in the shafts and dowel pins 110, 112 enter these grooves to prevent longitudinal movement of the shafts. The inner ends of the shafts 106 and 108 are provided respectively with eccentric pins 114 and 116 which enter slots in the jaws 102 and 104. When the shafts 106 and 108 are turned, the jaws are adjusted transversely so as to properly engage and guide the strip 10. By adjusting the guide jaws the position of the strip can be shifted toward the front or toward the rear so that the strip is properly located with respect to the several forming and cutting tools to be described. Set screws 118 and 120 are provided in the blocks 96 and 98, these screws having wrench sockets in their outer ends. Shoes are provided at the inner ends of the set screws, the said shoes engaging the respective jaws 102 and 104 to lock them in adjusted positions.

Located within the upper groove 90 at the left portion thereof is a block 122 held in place by screws 123, 123. The block 122 has a depending longitudinal central rib 124 which upon downward movement passes between the blocks 96 and 98 and engages the initial flat portion of the strip 10 as shown in Fig. 22. The said flat portion of the strip is supported on the block 92 and is clamped between the said block 92 and the said rib 124.

The lower shoe 54 is provided with an opening which communicates with the groove 88 at the right of the block 92. Located within the said opening is a block 126 which is secured to the lower plate 38 by means of screws 128. The tool 126 has a central longitudinal groove and is shaped at the top and at opposite sides of the groove to constitute a tool adapted to cooperate with an upper tool for forming the offset sections 14, 14 and the oppositely inclined portions 18, 18 of the strip 10. The block on tool 126 is shaped at its top to conform to the required shape or forming of the side portions of the strip 10 at the lower face thereof.

A block 130 is preferably provided adjacent the block 126 and at the right thereof and within the lower groove 88, this block being held in place by screws 132, 132. The block 130 has a longitudinal central groove and is shaped at the top and at opposite sides of the groove to conform to the shape or forming of the strip at the lower face thereof after the said strip has been acted upon by the tool 126 and by the upper tool mating therewith. Located within the central groove in the block 130 is a bar 134 held in place by screws 136, 136. This bar extends toward the left through the central groove in the block 126 and the left end of the bar abuts against the block 92.

Located within the upper groove 90 at the right of the block 122 is a block 138 held in place by screws 140. The bottom of the block 138 at the left portion thereof is shaped to constitute a tool adapted to cooperate with the tool 126 for forming the upwardly offset sections 14, 14 and the oppositely inclined portions 18, 18 of the strip. The tool 138 is shaped at the left portion of its bottom to conform to the required forming of the side portions of the strip 10 at the upper face thereof. Preferably the remainder of the bottom of the block or tool 138 is also shaped to conform to the forming of the strip at the upper face thereof after the said strip has been acted upon by the tool 126 and by the left portion of the block or tool 138.

In operation, with the strip 10 stationary, the parts carried by the upper plate are moved downwardly from the positions shown in Fig. 21 to those shown in Fig. 22. The central portion of the strip is clamped between the rib 124 and the block 92, downward movement of the shoe 56 with respect to the shoe 54 being limited by the engagement of the buttons 84, 84, 86, 86 with the buttons 74, 74, 76, 76. Continued downward movement of the plate 44 causes the compression of the springs 70, 70 and 82, 82, the various parts moving to the relative positions shown in Fig. 22. As the shoe 54 moves downwardly, the left portion of the tool 138 cooperates with the stationary tool 126 to shape or form the side portions of the strip with a pair of upwardly offset portions 14, 14 and with a pair of oppositely inclined portions 18, 18, socket sections 12, 12 being formed between the said upwardly offset sections. The cooperation of the tools 138 and 126 will be more readily apparent from Figs. 23 and 24. It will be observed that the central portion of the strip remains flat. While a new pair of offset sections and oppositely inclined portions are being shaped or formed as described, the previously shaped or formed sections and portions are clamped between the right portion of the block 138 and the block 130.

Immediately thereafter the parts are restored to the positions shown in Fig. 21 and the strip is moved toward the right by the wheels 50 and 52, the extent of movement being exactly equal to the spacing between two adjacent offset sections 14, 14 or between two adjacent socket sections 12, 12. The operations as described are repeated indefinitely.

It will be observed that the right portion of the block 138 and the block 130, by reason of their engagement with the previously shaped or formed portions of the strip serve to accurately position the strip after each longitudinal movement thereof, the wheels 50 and 52 therefore not being depended upon for the accuracy of the spacing.

Located within the lower groove 88 at the right of the block 130 is a block 142 held in place by screws 144, 144, and a block 146 held in place by screws 148, 148. Located within the upper groove 90 at the right of the block 138 is a block 150 held in place by screws 152, 152, and a block 154 held in place by screws 156, 156. Secured to the blocks 150 and 154 are longitudinal bars 158 and 160, shaped in cross sections as shown in Figs. 25 and 27 to fit the central portion 16 of the strip and the angularly disposed portions 18, 18 thereof.

The block 142 is provided near its left end with a vertical hole for receiving a stripping pin 162 which is biased in the upward direction by a coil spring 164 located in apertures in the shoe 54 and in the plate 38. When the parts are in the engaging positions shown in Fig. 22, the bar 158 engages the central portion of the strip which is then clamped between the said bar and the block 142. The top of the pin 162 is held flush with the top of the block 142. When the parts are separated to the positions shown in Fig. 21, the spring 164 moves the pin 162 relatively upwardly so that its upper end projects above the top of the block 142. Thus the strip is raised so as to be disengaged from the projections on the tool 126 and on the block 130. Being disengaged from the said projections, the strip is free to be moved longitudinally by the wheels 50 and 52.

Connected to the lower plate 38 and located within a recess in the shoe 54 is a block 166. Secured to the block 166 and projecting upwardly therefrom through suitable holes in the block 142 are two similar notching punches 168, 168. The punches 168 are positioned and shaped to cut or punch the before-mentioned notches 20, 20 in the upwardly offset sections 14, 14 of the strip. The top cutting faces of the punches 168 are above the top of the block 142 when the parts are in the separated positions shown in Fig. 21.

The two blocks 150 and 154 carried by the upper shoe 56 meet at a transverse vertical plane at the center lines of the punches 168, 168. The two blocks are notched as shown at 170, 170, the said notched blocks constituting a female die member for cooperating with and receiving the punches 168, 168 as will be more readily apparent from Fig. 25. The adjacent end faces of the blocks 150 and 154 are formed as shown in detail in Fig. 26. Fig. 26 shows the left end of the block 154, but it will be understood that the right end of the block 150 is similarly formed. It will be seen that the block 154 has a central projection 172 which provides the inner edges of the notches 170 and has two projections 174, 174 at the sides which provide the outer edges of the notches 170, 170. The end faces of the projections 172 and 174, 174 of the two blocks engage each other, but each block has a face 176 which is spaced from the end faces of the projections, the said faces 176 of the two blocks being thus spaced apart. Located between the faces 176 of the two blocks is a member 178 having oppositely curved lower faces 180, 180. The curved faces 180, 180 cooperate with similarly curved faces on the projections 174, 174 to provide channels 182, 182 which extend upwardly and outwardly from the notches 170, 170.

When the parts are moved to their engaging positions as shown in Figs. 22 and 25, the shoe 56 and the parts carried thereby are moved downwardly. The shoe 54 and the parts carried thereby, including the block 142, are also moved downwardly relatively to the plate 38 as previously described. The punches 168, 168 are stationary. The strip is moved downwardly by the bar 158 and by the blocks 150 and 154, the result being that the punches 168, 168 cut or punch the notches 20, 20. The punchings move relatively upwardly into the channels 182, 182.

In order that the punchings may be suitably disposed of, the said channels 182, 182 communicate with channels 184, 184 formed partly in the upper shoe 56 and partly in blocks 186 and 188 secured to the said shoe 56. The two blocks 186 and 188 are similar except that they are reversely positioned and shaped. The blocks are connected with the upper shoe 56 by means of screws 190, 190 and they are connected with the block 154 by means of screws 192, 192. As more clearly shown in Fig. 25, each block 186 and 188 is provided at its bottom with a large threaded opening which communicates with the corresponding channel 184. Threaded into the openings in the blocks are vertical tubes 194 and 196. The tubes extend downwardly through openings in the lower shoe 54 and into openings in the lower plate 38. Each block preferably has a slot 198 therein, and a screw 199 extends through the block and across the slot. The screw serves to slightly deform the block to clamp the corresponding tube in place.

As successive notches 20, 20 are punched by the punches 168, 168, the punchings are forced upwardly into the channels 182, 182 and then into the channels 184, 184. From the channels 184, 184 the punchings move by gravity into the tubes 194 and 196. Below the tubes 194 and 196 are chutes or other receptacles, not shown, for receiving the punchings.

Also carried by the block 166 are two coining punches 200, 200 which extend upwardly through suitable holes in the block 142. The coining punches are clearly shown in Fig. 27. These coining punches are spaced transversely to the same extent as the notching punches 168, 168 and are spaced longitudinally from the notching punches to an extent which is a multiple of the longitudinal spacing. As shown punches 200, 200 are spaced from the punches 168, 168 to an extent equal to the before-mentioned longitudinal spacing but it may be another multiple thereof. The top faces of the coining punches 200, 200 are wider than the top faces of the notching punches 168, 168 in the longitudinal direction, and the said top faces are lower than the top faces of the notching punches. The portions of the lower face of the block 154 opposite the coining punches 200, 200 constitute anvils for cooperating with the said punches. During the reciprocation immediately following the punching of the notches, the coining punches 200, 200 engage the upwardly offset sections 14, 14 of the strip, and they serve in conjunction with the immediately opposite anvils to flatten any projecting burrs that may have been formed on the said offset sections by the punching operation.

Connected to the upper plate 44 and located in a recess in the upper shoe 56 is a block 202. Secured to the block 202 is a punch 204 which extends downwardly through a suitable opening formed in the block 154 and through an opening formed partly in the bar 158 and partly in the bar 160. The lower end portion of the punch 204 is shaped in conformity with the before-mentioned holes 22, 22 in the strip. The adjacent end portion of the bars 158 and 160 are shaped to conform with the shape of the punch. As before stated the shape of each of the holes 22 is such as to provide the before mentioned tabs 24, 24.

The two blocks 142 and 146 carried by the lower shoe 54 meet at a transverse vertical plane at the center line of the punch 204. The said blocks 142 and 146 are provided with registering notches 206 and 208 which are shaped to conform with the shape of the punch, the said blocks therefore constituting a female die member for receiving the punch 204. The said notches 206 and 208 communicate with a channel 210 formed between the blocks 142 and 146, this channel in turn communicating with a tube 212 in an opening in the lower shoe 54. The tube 212 projects into a vertical hole 214 in the lower plate 72.

As the parts are reciprocated the punch 204 successively engages the central portion of the strip to punch the holes 22, 22 therein, the punchings passing downwardly through the channel 210, the tube 212 and the hole 214. A suitable chute or receptacle, not shown, is provided for receiving the punchings.

The several blocks 92, 130, 142 and 146 are secured in place in the groove 88 in the lower shoe 54 by means of screws. They may, if desired, be additionally located by means of dowel pins.

While the blocks may be satisfactorily held by screws and dowel pins, it is preferred to provide additional means for preventing the blocks from moving endwise in the groove. Means is therefore provided for applying endwise pressure to the blocks, it being understood that the blocks 92 and 142 are held in spaced relationship by the bar 134 which extends between them and abuts against them at its ends.

Secured to the shoe 54 at the right end thereof is a bridge member 216 which is held in place by screws 218, 218. The bridge member 216 extends across the right end of the groove 88, and the inner face of the bridge member engages the outer face of the block 146. Secured to the shoe 54 at the left end thereof is a bridge member 220 which is held in place by screws 222, 222. The bridge member 220 extends across the left end of the groove 88 and it has a projection at its inner side which engages the outer face of the block 92. The bridge member 216 when in place prevents any movement of the blocks toward the right. The bridge member 220 by reason of the projection thereon serves, when the screws 222, 222 are tightened, to apply endwise pressure to the blocks, the blocks thus being clamped between the two bridge members.

A bridge member 224 similar to the bridge member 216 is provided at the right end of the upper shoe 56, this bridge member being held in place by screws 226, 226. A bridge member 228 similar to the bridge member 220 is provided at the left end of the shoe 56, this bridge member being held in place by screws 230, 230. The bridge members 224 and 228 act in the same manner as the before-described bridge members 216 and 220 and they serve to prevent endwise movement of the several blocks 122, 138, 150 and 154.

Summarizing as to the action of the dies 34 and 40, it will be seen that upon each downward movement of the upper die the strip is clamped between the lower blocks 92, 130, 142 and 146 and the upper blocks 122, 138, 150 and 154. The clamping engagement is limited by the buttons 74, 74 and 76, 76 on the lower shoe and the buttons 84, 84 and 86, 86 on the upper shoe. No forming or punching occurs until the upper plate 44 is moved downwardly with respect to the lower plate 38 sufficiently to compress the springs 70, 70 and 82, 82. As the springs 70, 70 are compressed, the lower shoe moves downwardly, thus causing the forming tool 126 and the notching punches 168, 168 and the coining punches 200, 200 to perform their functions. As the springs 82, 82 are compressed, the upper plate 44 moves downwardly relatively to the upper shoe 56, thus causing the punch 204 to perform its function. When the several said tools have performed their functions the parts are in the positions shown in Fig. 22. As soon as the several said tools have performed their functions, the parts are moved from the relative positions shown in Fig. 22 to the relative positions shown in Fig. 21, the stripping pin 162 serving to relatively raise the strip. Then the strip is advanced by a distance equal to the spacing between stations and the before-described operations are repeated.

The construction and arrangement of the forming and cutting dies as shown and described is that presently preferred, but it will be obvious that, without departing from the invention, the positions of many of the parts may be reversed, those now shown below the strip being then above the strip and those now shown above the strip being then below the strip. It is to be understood that in most instances the terms such as "lower," "upper," "below," "above," and the like are used for convenience of description and not in a limiting sense.

Dies for bending strip to provide channel

The action of the relatively reciprocating dies 36 and 42 will now be described, it being understood that these dies act upon the strip after it has been acted upon, as described, by the dies 34 and 40.

Rigidly secured to the lower plate 38 is a block 232. The block 232 is provided with a central longitudinal slot within which is located a vertically movable plate 234. The plate 234 is provided with transversely extending pins 236, 236 which are entered in notches in the block 232, these pins thus serving to guide the block for vertical movement and to limit such movement. Preferably the vertical movement of the plate 234 is additionally guided by means of a transverse pin 238 carried by the block and extending through a vertical slot in the plate. Positioned in suitable apertures in the block 232 are vertically movable plungers 240, 240, the upper ends of the plungers bearing against the bottom of the plate. The plungers are biased in the upward direction by the coil springs 242, 242 located in apertures in the block 232 and in the plate 38. The plungers and the springs tend to hold the plate 234 in its upper position as shown in Figs. 15 and 21 but permit it to be moved to its lower position as shown in Fig. 22. The upper portion of the slot in the block 232 has a progressively different cross sectional shape from left to right as illustrated in Figs. 28 and 29.

Rigidly secured to the upper plate 44 is a block 244 having a central longitudinal slot therein, a plate 246 being located within the slot and being held in place by transverse screws 248, 248.

At each reciprocation the plate 246 is moved downward to engage the central portion of the strip, the said central portion of the strip being clamped between the plate 246 and the plate 234. By reason of the varying cross sectional shape of the upper portion of the slot in the block 232, the side portions of the strip are bent progressively upwardly and inwardly as illustrated in Figs. 28 and 29 and as further illustrated in Figs. 6 to 9. Thus the strip is bent along longitudinal lines to provide an open-front channel with the socket and offset sections of the strip constituting diverging side walls and with the central portion of the strip constituting a bottom or rear wall.

The plate 234 is formed with an upwardly projecting tooth 250 which is positioned to enter each hole 22 in the strip as the successive holes come into register with the said tooth. The plate 246 has a notch 252 which registers with the tooth 250 and also has a similar notch 254 spaced toward the right by one station. During each downward movement of the plate 246 the tooth 250 cooperates with the notch 252 to forwardly or upwardly bend the tabs 24, 24 which project inward into the holes 22, 22. The notch 254 provides clearance for the tabs which were forwordly or upwardly bent during the next preceding operation.

Mechanisms for assembling fibers with strip

The mechanisms for assembling the fibers with the strip are carried, as before-stated, by the bracket 48. Supported in suitable bearings on the bracket 48 is a transverse shaft 256 which carries a sprocket wheel 258 at its rear end. A chain 260 passes around the sprocket wheel 258 and also around a sprocket wheel 262 on a shaft rotatable in suitable bearings in the main base. The last said shaft is connected with the mechanism which reciprocates the forming and cutting tools and the shaft 256 is therefore rotated in proper timed relation with the last said mechanism. Mounted on the shaft 256 is a gear 264 which may be operatively connected with the shaft by means of a suitable clutch, not shown in detail, the clutch being operable by a hand lever 266. When the clutch is engaged, the gear 264 is rotated in unison with the shaft 256.

The gear 264 meshes with a gear 268 on a transverse rotatable shaft 270. A transverse rotatable shaft 272 is provided and the said shaft 272 is intermittently rotated by means of the shaft 270. For this purpose a Geneva motion is provided which is indicated generally at 274, but which is not shown in detail.

The before-mentioned wheels 50 and 52 are carried respectively by shafts 276 and 278. The two shafts 276 and 278 are connected for rotation in opposite directions by means of intermeshing gears 280 and 282. The shaft 276 is driven by a gear 284 which meshes with a pinion 286 on the intermittently operated shaft 272.

The before-mentioned wheel 30 is carried by a transverse shaft 288. Secured to the shaft 288 is a gear 290 which meshes with the before-mentioned pinion 286 on the intermittently operated shaft 272. Preferably the wheel 30 is not directly connected with the shaft 288, but is indirectly connected therewith by means of a bifurcated arm 292 which is rigidly secured to the shaft. A pin 294 on the wheel 30 projects between the bifurcations of the arm 292, and is engaged by screws 296, 296 extending through the bifurcations. By adjusting the screws 296, 296, the wheel 30 may be rotatively adjusted on the shaft.

It will be seen that when the shaft 256 and the gear 264 are rotated in timed relation with the reciprocation of the forming and cutting tools the wheels 50 and 52 and the wheel 30 are intermittently operated, the gearing being such that the directions of intermittent movement are those indicated by arrows in Figs. 13 and 30. The extent of each intermittent movement is the same as the spacing between two adjacent pairs of socket sections of the strip.

As previously stated, the wheels 50 and 52 engage the strip to advance it intermittently. The wheel 52 has teeth which are shaped and spaced to enter the holes 22, 22 in the bottom of the strip between each two adjacent tabs 24, 24. The wheel 50 is formed with teeth which are spaced and shaped to engage the central portion of the strip between the holes 22, 22 therein. The wheel 52 is primarily relied upon to move the strip, the wheel 50 serving to hold the strip in engagement with the said wheel 52. The portion of the strip at the right of the wheels 50 and 52 is supported on a track 298 which is at such an elevation that the top face thereof is in register with the bottom of the strip as it passes between the wheels 50 and 52. The said track 298 is directly below the wheel 30.

As previously stated, the wheel 30 is provided with transverse fiber receiving notches 31, 31, and the wheel is provided with a circumferential groove 300 for receiving the wire 26. The depth of the groove 300 is such that the outer face of the wire 26 when in the groove is in substantial register with the inner edges of the notches 31, 31. As the wheel 30 is intermittently rotated, the wire 26 is intermittently moved, the wire being withdrawn from a reel, not shown, and being suitably guided to pass into the groove 300 in the wheel.

A fiber magazine is provided as generally indicated at 302. The details of the magazine do not constitute a part of the present invention and they will therefore not be described in detail. It is sufficient to point out that the magazine includes a vertical channel or chute within which a mass of transverse fibers is located, the said mass of fibers being automatically pressed downwardly. Extending across the bottom of the fiber chute of the magazine is a segment 304 which is supported for oscillation on a transverse shaft 306. The segment is oscillated between the positions shown respectively in Fig. 30 and in Fig. 31 by means of a link 308 operated by a crankpin 310 on the shaft 256. The segment moves through one complete cycle during each rotation of the shaft 256 and during each intermittent movement of the wheels 50, 52 and 30. The segment serves at all times to obstruct the bottom of the magazine chute, but it is provided with a transverse notch 312 of such size as to be adapted to receive a sufficient quantity of fibers to form one tuft of the completed brush element. When the segment is in the position shown in Fig. 31, the fibers enter the notch 312. Then the segment is moved to bring the notch 312 into register with one of the notches 31 in the wheel 30. Associated with the segment 304 is a retaining block 314 which serves to prevent the escape of fibers from the notch 312 while the segment is moving from the position shown in Fig. 31 to the position shown in Fig. 30. In order that the notches 31, 31 of the wheel 30 may exactly register with the notch 312, the wheel may be rotatively adjusted by the screws 296, 296 as previously described.

A fiber transfer member is provided having arms 316 and 318 at the rear and at the front of the segment 304, the said member being mounted on a transverse shaft 320. The shaft 320 carries an arm 322 which is connected by a link 324 with a crankpin 326 on the shaft 270. When the notch 312 is in its upper position as shown in Fig. 31, the upper right faces of the transfer arms 316 and 318 are spaced from the wheel 30 as shown. The timing is such that when the notch 312 comes into register with a notch 31 in the wheel 30, the transfer arms are moved in a clockwise direction to the positions shown in Fig. 30 so as to force the fibers out of the notch 312 in the segment and into the corresponding notch 31 in the wheel. As the wheel 30 is indexed in the counterclockwise direction, the segment 304 with its notch 312 serves in cooperation with the transfer arms to place a bunch of fibers in each successive notch 31. The fibers are retained in the notches by means of a guide member 328 which is shaped to conform to the periphery of the wheel 30.

Preferably the transfer member is not directly connected with the shaft 320, but is indirectly connected therewith by means of an arm 330 which is rigidly secured to the shaft. A spring 332 is interposed between the transfer arm and the arm 330, this spring serving to bias the transfer member for movement in the clockwise direction. Such movement is limited by a nut on a screw 334. This last described construction enables the arms 316 and 318 of the transfer member to move until stopped by engagement with the fibers 28 as shown in Fig. 32. This definitely assures the complete entry of the fibers into the notch 31. When the movement of the arms 316 and 318 is stopped by the fibers the spring 332 yields.

As the strip is intermittently advanced and as the wheel 30 is intermittently turned, the wire 26 and the fiber bunches 28, 28 are fed at an angle into the channel of the strip, the bunches of fibers registering with the socket sections 12, 12 of the strip. As the bunches of fibers are pressed into the channel, the wire which is above them serves to partly fold them into the socket sections of successive pairs. The wire engages the front edges of the upwardly bent tabs 24, 24 and the bunches of fibers are between the upwardly bent tabs of successive pairs. In order that the wire and the bunches of fibers may be retained in the positions to which they are moved by the wheel 30, a shoe 336 is provided, the lower left portion of the shoe being located, as shown in Fig. 13, in the space between the wheel 30 and the top of the wire 26.

After the wire 26 and the fiber bunches 28, 28 have been inserted in the channel of the strip, the strip is additionally bent along longitudinal lines to complete the folding of the fibers and to bring the offset sections 14, 14 into engagement with each other so as to completely close the sockets. For this purpose two devices are provided at opposite sides of the strip for engaging the socket sections of the said strip to effect the required bending. Preferably the said devices are oppositely disposed and oppositely reciprocating jaws 338 and 340 are provided.

For carrying the jaws 338 and 340 there are levers 342 and 344, these being pivoted respectively for movement about longitudinal axes at 346 and 348. For operating the levers 342 and 344 there is provided a lever 350 pivoted for movement about a longitudinal axis at 352. The front end of the lever 350 is connected with the respective levers 342 and 344 by means of links 354, 354 and 356, 356. The lever 350 is oscillated by a link 358 engaging a crank pin 360 on a transverse shaft 362, as shown in Fig. 30. The shaft 362 is rotated by a gear 364 which meshes with the gear 268 on the shaft 270. By means of the mechanism described the levers 342 and 344 are oscillated in opposite directions, there being one cycle of oscillation for each intermittent movement of the strip.

The jaws 338 and 340 on the levers 342 and 344 are clearly shown in Figs. 35 and 36. The jaws are constructed and actuated to so engage the socket sections that the socket sections of each successive pair are moved to different extents as will be explained in detail.

The jaw 338 has three strip engaging faces 366, 368 and 370, and the jaw 340 has three strip engaging faces 372, 374 and 376. As the levers and jaws move toward each other, the face 372 on the jaw 340 engages the rear socket section of each successive pair at the position $12^a$ to move it forwardly slightly beyond the central plane. At the same time the face 366 on the jaw 338 engages the front socket section of each successive pair at the position $12^b$ to move it rearwardly to some extent but preferably not sufficiently to engage it with the mating rear socket section.

During the next following movement of the jaws, the face 368 on the jaw 338 engages the front socket section of each successive pair at the position $12^c$ which has previously been moved rearward to a limited extent. The socket section at 12ᶜ is moved rearwardly at least to the central plane and it engages the mating rear socket section at 12ᵈ which has previously been bent forwardly beyond the center line. The successive sockets are thus completely closed. Preferably both of the socket sections at 12ᶜ and 12ᵈ are moved to positions somewhat beyond the central plane as shown in Fig. 36. The face 374 on the jaw 340 cooperates with the face 368 to position the two socket sections as shown. The described movements of the opposite socket sections beyond the central plane, serve to insure firm engagement with resultant completely closed sockets.

The resiliency of the metal tends to move the socket sections to the central plane when they reach the positions 12ᵉ and 12ᶠ. However, during the next following movement of the jaws the opposed faces 376 and 370 on the jaws 338 and 340 cooperate to insure the movement of the socket sections at the positions 12ᵉ and 12ᶠ to central positions, these socket sections then constituting a completely closed centrally located socket.

Preferably the jaws 338 and 340 are provided respectively with fingers 378 and 380 which are of such size and so positioned as to extend between the fiber tufts while the sockets are being closed. These fingers insure the maintenance of the fibers in their forward extending positions.

The invention claimed is:

1. The method of making a brush element of the strip type which comprises moving an initially flat strip of metal longitudinally through successive zones, at one zone forming the side portions of the strip so as to provide longitudinally spaced pairs of oppositely disposed transversely extending concave socket sections and so as to provide pairs of oppositely disposed upwardly offset sections which are between the pairs of socket sections and which are connected by angularly disposed portions with the central portion of the strip, at another zone bending the strip along longitudinal lines to provide an open-front channel with the said socket and offset sections of the strip constituting diverging side walls and with the central portion of the strip constituting a bottom wall, at another zone feeding a longitudinal wire and bunches of transverse fibers downwardly into the channel, the wire being fed at an angle into a position between the side walls and near the rear wall and the bunches of fibers being below the wire and being longitudinally spaced so that they are partly folded into the successive pairs of concave socket sections as the strip and the wire are advanced, and at another zone additionally bending the strip along longitudinal lines to additionally fold the bunches of fibers and to bring the said angularly disposed portions of the strip above the wire and to bring the offset sections of successive pairs into engagement with each other so that the socket sections of successive pairs form complete sockets with the folded fibers of the successive bunches looped around the wire and positioned within the successive sockets and projecting forwardly therefrom to constitute tufts.

2. The method of making a brush element of the strip type which comprises moving an initially flat strip of metal longitudinally through successive zones, at one zone forming the side portions of the strip so as to provide longitudinally spaced pairs of oppositely disposed transversely extending concave socket sections and so as to provide pairs of oppositely disposed upwardly offset sections which are between the pairs of socket sections and which are connected by angularly disposed portions with the central portion of the strip, at another zone cutting the strip to form pairs of oppositely disposed notches in the offset sections extending inwardly approximately to the angularly disposed portions and to form holes in the central portion transversely registering with the notches and extending outwardly approximately to the said angularly disposed portions, at another zone bending the strip along longitudinal lines to provide an open-front channel with the said socket and offset sections of the strip constituting diverging side walls and with the central portion of the strip constituting a bottom wall, at another zone feeding a longitudinal wire and bunches of transverse fibers downwardly into the channel, the wire being fed at an angle into a position between the side walls and near the rear wall and the bunches of fibers being below the wire and being longitudinally spaced so that they are partly folded into the successive pairs of concave socket sections as the strip and the wire are advanced, and at another zone additionally bending the strip along longitudinal lines to additionally fold the bunches of fibers and to bring the said angularly disposed portions of the strip above the wire and to bring the offset sections of successive pairs into engagement with each other so that the socket sections of successive pairs form complete sockets with the folded fibers of the successive bunches looped around the wire and positioned within the successive sockets and projecting forwardly therefrom to constitute tufts.

3. The method as set forth in claim 2, wherein the angularly disposed portions are formed at oppositely inclined angles of approximately 45° and are made concave.

4. The method as set forth in claim 2, wherein the holes in the central portion of the strip are shaped to provide tabs which extend longitudinally and oppositely, wherein the tabs are subsequently bent forwardly, and wherein the wire is fed into engagement with the front edges of the forwardly bent tabs and wherein the bunches of fibers are fed to positions between the tabs of successive pairs.

5. The method of making a brush element of the strip type which comprises moving an initially flat strip of metal longitudinally through successive zones, at one zone forming the side portions of the strip so as to provide longitudinally spaced pairs of oppositely disposed transversely extending concave socket sections and so as to provide pairs of oppositely disposed upwardly offset sections which are between the pairs of socket sections and which are connected by angularly disposed portions with the central portion of the strip, at another zone bending the strip along longitudinal lines to provide an open-front channel with the said socket and offset sections of the strip constituting diverging side walls and with the central portion of the strip constituting a bottom wall, at another zone feeding a longitudinal wire and bunches of transverse fibers downwardly into the channel, the wire being fed at an angle into a position between the side walls and near the rear wall and the bunches of fibers being below the wire and being longitudinally spaced so that they are partly folded into the successive pairs of concave socket sections as the strip and the wire are advanced, at another zone bending the strip along longitudinal lines to move each successive socket section at one side inward beyond the central plane, and at a leading portion of the last said zone moving each successive socket section at the opposite side inward at least to the central plane so that the successive socket sections at opposite sides are firmly engaged with each other.

6. In a machine for making a brush element of the strip type, the combination of means for moving a horizontal initially flat strip of metal longitudinally through successive zones, opposed dies at one zone and above and below the path of strip movement for forming the side portions of the strip so as to provide longitudinally spaced pairs of oppositely disposed transversely extending concave socket sections and so as to provide pairs of oppositely disposed forwardly offset sections which are between the pairs of socket sections, means at another zone for bending the strip upwardly along longitudinal lines to provide an open-front channel, means at another zone for feeding into the channel of the strip a longitudinal wire and longitudinally spaced bunches of transverse fibers positioned below the wire, the last said means causing the bunches of fibers to be partly folded into the successive pairs of socket sections, and means at another zone for additionally bending the strip along longitudinal lines so as to bring the socket sections of successive pairs into closed relationship and so as to complete the folding of the bunches of fibers.

7. In a machine for making a brush element of the strip type, the combination of means for moving a horizontal initially flat strip of metal longitudinally through successive zones, opposed dies at one zone and above and below the path of strip movement for forming the side portions of the strip so as to provide longitudinally spaced pairs of oppositely disposed transversely extending concave socket sections and so as to provide pairs of oppositely disposed forwardly offset sections between the pairs of socket sections and so as to also provide angularly disposed portions connecting the said offset portions with the central portion of the strip, means at another zone for bending the strip upwardly along longitudinal lines to provide an open-front channel, means at another zone for feeding into the channel of the strip a longitudinal wire and longitudinally spaced bunches of transverse fibers positioned below the wire, the last said means causing the bunches of fibers to be partly folded into the successive pairs of socket sections, and means at another zone for additionally bending the strip along longitudinal lines so as to additionally fold the bunches of fibres and so as to bring the said angularly disposed portions of the strip above the wire and to bring the offset sections of successive pairs into engagement with each other with the socket sections of successive pairs forming complete sockets.

8. In a machine for making a brush element of the strip type, the combination of means for moving a horizontally initially flat strip of metal longitudinally through successive zones, opposed dies at one zone and above and below the path of strip movement for forming the side portions of the strip so as to provide longitudinally spaced pairs of oppositely disposed transversely extending concave socket sections and so as to provide pairs of oppositely disposed forwardly offset sections which are between the pairs of socket sections, means at another zone and above and below the path of strip movement for bending the strip upwardly along longitudinal lines to provide an open-front channel, means at another zone for feeding into the channel of the strip a longitudinal wire and longitudinally spaced bunches of transverse fibers positioned below the wire, the last said means causing the bunches of fibers to be partly folded into the successive pairs of socket sections as the strip and the wire are advanced, means at another zone for additionally bending the strip along longitudinal lines so as to bring the socket sections of successive pairs forming complete sockets into closed relationship and so as to complete the folding of the bunches of fibers, transversely opposite guides adjacent the initial end of the first zone for engaging the edges of the strip, and means for adjusting the guides transversely to properly locate the strip transversely with respect to the said opposed dies at the first zone.

9. In a machine for making a brush element of the strip type, the combination of means for intermittently moving an initially flat strip of metal longitudinally through successive zones, opposed relatively reciprocating dies at one zone for forming the side portions of the strip so as to provide longitudinally spaced pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, and means at another zone for additionally bending the strip along longitudinal lines so as to bring the socket sections of successive pairs into closed relationship and so as to complete the folding of the bunches of fibers.

10. A machine as set forth in claim 9, wherein the means for bending the strip to provide an open-front channel comprises opposed relatively reciprocating dies movable in unison with the strip forming dies.

11. A machine as set forth in claim 9, wherein the relatively reciprocating forming dies and the means for bending the strip to provide a channel are at the trailing side of the intermittently acting strip moving means, and wherein the means for feeding wire and fibers and the means for additionally bending the strip to close the sockets are at the leading side of the feeding means.

12. A machine as set forth in claim 11, wherein the strip moving means comprises opposed intermittently rotatable wheels engageable with the strip and respectively located above it and below it.

13. A machine as set forth in claim 11, wherein means is provided at the trailing side of the strip moving means for cutting the central portion of the strip to provide holes therein spaced in conformity with the spacing of the pairs of socket sections, and wherein the said strip moving means comprises opposed intermittently rotatable wheels respectively located above and below the strip, the lower wheel having teeth shaped and spaced to enter the holes in the central portion of the strip and the upper wheel serving to hold the strip in engagement with the lower wheel.

14. A machine as set forth in claim 9, wherein the relatively reciprocating dies at the first zone include a lower stationary plate, a shoe carried by the lower plate and spring biased to an upper position with respect thereto which shoe has an opening therethrough, an upper vertically reciprocable shoe above the lower shoe, the said upper shoe upon downward movement thereof causing downward movement of the lower shoe in opposition to the spring bias thereof, a stationary lower forming tool rigidly secured to the lower stationary plate and extending into the opening in the lower shoe which tool is shaped at its top to conform to the required forming of the side portions of the strip at the lower face thereof, and an upper forming tool carried by the upper shoe above the lower forming tool and shaped at its bottom to conform to the required forming of the side portions of the strip at the upper face thereof, the said upper forming tool upon downward movement thereof and upon downward movement of both shoes cooperating with the stationary lower forming tool to form the side portions of the strip to the required shape.

15. A machine as set forth in claim 9, wherein the relatively reciprocating dies at the first zone include a lower stationary plate, a shoe carried by the lower plate and spring biased to an upper position with respect thereto which shoe has an opening therethrough, interengageable buttons on the upper and lower shoes for causing the lower shoe to move downward in opposition to its spring bias, the said buttons engaging each other after a predetermined initial downward movement of the said upper shoe, an upper vertically reciprocable shoe above the lower shoe, a stationary lower forming tool rigidly secured to the lower stationary plate and extending into the opening in the lower shoe which tool is shaped at its top to conform to the required forming of the side portions of the strip at the lower face thereof, and an upper forming tool carried by the upper shoe above the lower forming tool and shaped at its bottom to conform to the required forming of the side portions of the strip at the upper face thereof, the said upper forming tool upon downward movement thereof and upon downward movement of both shoes cooperating with the stationary lower forming tool to form the side portions of the strip to the required shape.

16. A machine as set forth in claim 9, wherein the relatively reciprocating dies at the first zone include a lower stationary plate, a shoe carried by the lower plate and spring biased to an upper position with respect thereto which shoe has an opening therethrough, an upper vertically reciprocable shoe above the lower shoe, the said upper shoe upon downward movement thereof causing downward movement of the lower shoe in opposition to the spring bias thereof, a stationary lower forming tool rigidly secured to the lower stationary plate and extending into the opening in the lower shoe which tool is shaped at its top to conform to the required forming of the side portions of the strip at the lower face thereof, an upper forming tool carried by the upper shoe above the lower forming tool and shaped at its bottom to conform to the required forming of the side portions of the strip at the upper face thereof, the said upper forming tool upon downward movement thereof and upon downward movement of both shoes cooperating with the stationary lower forming tool to form the side portions of the strip to the required shape, and opposed strip engaging means at the trailing side of the forming tools and carried respectively by the lower shoe below the position of the strip and by the upper shoe above the position of the strip, the said strip engaging means serving to clamp the strip during the forming thereof by the said forming tools.

17. A machine as set forth in claim 9, wherein the relatively reciprocating dies at the first zone include a lower stationary plate, a shoe carried by the lower plate and spring biased to an upper position with respect thereto which shoe has an opening therethrough, an upper vertically reciprocable shoe above the lower shoe, the said upper shoe upon downward movement thereof causing downward movement of the lower shoe in opposition to the spring bias thereof, a stationary lower forming tool rigidly secured to the lower stationary plate and extending into the opening in the lower shoe which tool is shaped at its top to conform to the required forming of the side portions of the strip at the lower face thereof, an upper forming tool carried by the upper shoe above the lower forming tool and shaped at its bottom to conform to the required forming of the side portions of the strip at the upper face thereof, the said upper forming tool upon downward movement thereof and upon downward movement of both shoes cooperating with the stationary lower forming tool to form the side portions of the strip to the required shape, and opposed strip engaging means at the leading side of the forming tools and carried respectively by the lower shoe below the position of the strip and by the upper shoe above the position of the strip, the said strip engaging means being shaped to conform respectively to the forming of the lower and upper faces of the strip after the action of the forming tools and the said means serving by their engagement with the formed strip to accurately position it longitudinally for the next following forming thereof by the forming tools.

18. In a machine for making a brush element of the strip type, the combination of means for intermittently moving an initially flat strip of metal longitudinally through successive zones, opposed relatively reciprocating dies at one zone and above and below the path of strip movement for forming the side portions of the strip so as to provide longitudinally spaced pairs of oppostiely disposed transversely extending concave socket sections and so as to provide pairs of oppositely disposed forwardly offset sections between the pairs of socket sections, opposed relatively reciprocating means at another zone and above and below the path of strip movement and including punches and a female die member for cutting the strip to provide pairs of oppositely disposed inwardly extending notches in the offset portions, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections as the strip and the wire are intermittently advanced, and means at another zone for additionally bending the strip along longitudinal lines so as to bring the socket sections of successive pairs into closed relationship and so as to complete the folding of the bunches of fibers.

19. A machine as set forth in claim 18, wherein the relatively reciprocating means for cutting the strip to provide notches include a lower stationary plate, a shoe carried by the lower plate and spring biased to an upper position with respect thereto which shoe has two transversely spaced vertical holes therethrough registering with the positions of the required notches in the offset sections of the strip, an upper vertically reciprocable shoe above the lower shoe, the said upper shoe upon downward movement thereof causing downward movement of the lower shoe in opposition to the spring bias thereof, two stationary punches rigidly secured to the lower stationary plate and extending into the holes in the lower shoe which punches are shaped in conformity with the required shapes of the notches, and a female die member carried by the upper shoe above the punches and shaped to fit them, the said female die member upon downward movement thereof and upon downward movement of both shoes cooperating with the punches to cut the notches in the offset sections of the strip.

20. A machine as set forth in claim 18, wherein the relatively reciprocating means for cutting the strip to provide notches include a lower stationary plate, a shoe carried by the lower plate and spring biased to an upper position with respect thereto which shoe has two transversely spaced vertical holes therethrough registering with the positions of the required notches in the offset sections of the strip, an upper vertically reciprocable shoe above the lower shoe, the said upper shoe upon downward movement thereof causing downward movement of the lower shoe in opposition to the spring bias thereof, two stationary punches rigidly secured to the lower stationary plate and extending into the holes in the lower shoe which punches are shaped in conformity with the required shapes of the notches, a female die member carried by the upper shoe above the punches and shaped to fit them, the said female die member upon downward movement thereof and upon downward movement of both shoes cooperating with the punches to cut the notches in the offset sections of the strip, and means on the upper shoe provided with transversely spaced channels for receiving punchings from the female die member, the said channels extending upward and in transversely opposite directions from the die member.

21. A machine as set forth in claim 18, wherein the relatively reciprocating means for cutting the strip to provide notches include a lower stationary plate having two transversely spaced holes therein, at the second zone, a shoe carried by the lower plate and spring biased to an upper position with respect thereto which shoe has two transversely spaced vertical holes therethrough registering with the positions of the required notches in the offset sections of the strip and which shoe has two other holes therethrough registering with the said holes in the lower stationary plate, an upper vertically reciprocable shoe above the lower shoe, the said upper shoe upon downward movement thereof causing downward movement of the lower shoe in opposition to the spring bias thereof, two stationary punches rigidly secured to the lower stationary plate and extending into the holes in the lower shoe which punches are shaped in conformity with the required shapes of the notches, a female die member carried by the upper shoe above the punches and shaped to fit them, the said female die member upon downward movement thereof and upon downward movement of both shoes cooperating with the punches to cut the notches in the offset sections of the strip, means on the upper shoe provided with transversely spaced channels for receiving punchings from the female die member, the said channels extending upward and in transversely opposite directions from the die member, and two tubes carried by the upper shoe and extending through the registering holes in the lower shoe and in the lower stationary plate, the said tubes at their upper ends communicating with the outer ends of the respective channels to receive punchings and conduct them downward through the lower shoe and through the lower stationary plate.

22. In a machine for making a brush element of the strip type, the combination of means for intermittently moving an initially flat strip of metal longitudinally through successive zones, opposed relatively reciprocating dies at one zone and above and below the path of strip movement for forming the side portions of the strip so as to provide longitudinally spaced pairs of oppositely disposed transversely extending concave socket sections and so as to provide pairs of oppositely disposed forwardly offset sections between the pairs of socket sections, opposed relatively reciprocating means at another zone and above and below the path of strip movement and including punches and female die member for cutting the strip to provide pairs of oppositely disposed inwardly extending notches in the offset portions, opposed relatively reciprocating means above and below the path of strip movement and spaced in the leading direction from the notch cutting means to an extent which is a multiple of the longitudinal spacing, the last said relatively reciprocating means including coining punches and opposed anvils for flattening any burrs formed by the notch cutting means, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections as the strip and the wire are intermittently advanced, and means at another zone for additionally bending the strip along longitudinal lines so as to bring the socket sections of successive pairs into closed relationship and so as to complete the folding of the bunches of fibers.

23. In a machine for making a brush element of the strip type, the combination of means for intermittently moving an initially flat strip of metal longitudinally through successive zones, opposed relatively reciprocating dies at one zone and above and below the path of strip movement for forming the side portions of the strip so as to provide longitudinally spaced pairs of oppositely disposed transversely extending concave socket sections and so as to provide pairs of oppositely disposed forwardly offset sections between the pairs of socket sections, opposed relatively reciprocating means at another zone and above and below the path of strip movement for cutting the strip to provide holes in the central portion of the strip, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of concave socket sections, and means at another zone for additionally bending the strip along longitudinal lines so as to bring the socket sections of successive pairs into closed relationship and so as to complete the folding of the bunches of fibers.

24. A machine as set forth in claim 23, wherein the relatively reciprocating means for cutting the strip to provide holes in the central portion thereof include an upper vertically reciprocating plate, a shoe carried by the upper plate and spring biased to a lower position with respect thereto which shoe has a transversely central vertical hole therethrough in the second said zone, a lower shoe below the upper shoe, the said lower shoe limiting downward movement of the upper shoe and thereby causing relative upward movement of the upper shoe in opposition to the spring bias thereof, a punch rigidly secured to the upper reciprocating plate and extending into the hole in the upper shoe which punch is shaped in conformity with the required shape of the holes in the strip, and a female die member carried by the lower shoe below the punch and shaped to fit it, the said female die member upon relative upward movement of the upper shoe with respect to the punch cooperating with the said punch to cut the required holes in the central portion of the strip.

25. A machine as set forth in claim 23, wherein the means for cutting the strip to provide holes therein is so shaped that the holes are formed with tabs extending longitudinally and in opposite directions, wherein means is provided in the leading direction from the hole cutting means for upwardly bending the aforesaid tabs, and wherein the means for feeding a wire and bunches of fibers serves to feed the wire substantially into engagement with the upwardly bent tabs and serves to feed the bunches of fibers to positions between successive pairs of upwardly bent tabs.

26. A machine as set forth in claim 23, wherein the means for bending the strip to provide an open-front channel comprises opposed relatively reciprocating dies movable in unison with the strip forming dies, and wherein the means for upwardly bending the tabs is carried by the dies for bending the strip to provide a channel.

27. A machine as set forth in claim 23, wherein the relatively reciprocating forming dies and the means for bending the strip to provide a channel are at the trailing side of the intermittently acting strip moving means, wherein the means for feeding wire and fibers and the means for additionally bending the strip to close the sockets are at the leading side of the feeding means, and wherein the strip moving means comprises opposed intermittently rotatable wheels respectively located above and below the strip, the lower wheel having teeth shaped and spaced to enter the holes in the central portion of the strip between the corresponding upwardly bent tabs and the upper wheel serving to hold the strip in engagement with the lower wheel.

28. In a machine for making a brush element of the strip type, the combination of means for intermittently moving an initially flat strip of metal longitudinally through successive zones, opposed relatively reciprocating dies at one zone and above and below the path of strip movement for forming the side portions of the strip so as to provide longitudinally spaced pairs of oppositely disposed transversely extending concave socket sections and so as to provide pairs of oppositely disposed forwardly offset sections between the pairs of socket sections, opposed relatively reciprocating means at another zone and above and below the path of strip movement for cutting the strip to form pairs of oppositely disposed inwardly extending notches in the offset portions and to form holes in the central portion transversely registering with the notches, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections as the strip and the wire are intermittently avanced, and means at another zone for additionally bending the strip along longitudinal lines so as to bring the socket sections of successive pairs into closed relationship and so as to complete the folding of the bunches of fibers.

29. A machine as set forth in claim 28, wherein the means at the first and second zones for forming the side portions of the strip and for cutting notches and holes in the strip include lower and upper relatively reciprocating shoes, the lower shoe having a longitudinal central groove at the top and the upper shoe having a similar longitudinal central groove at the bottom, a longitudinal series of lower tools having portions thereof in the groove of the lower shoe, a longitudinal series of upper tools cooperating with the lower tools and having portions thereof in the groove of the upper shoe, a bridge member connected with the lower shoe at one end thereof and extending across the groove therein, a bridge member connected with the lower shoe at the opposite end thereof and extending across the groove therein, means for moving one bridge member toward the lower shoe to clamp the lower tools within the groove in the lower shoe, a bridge member connected with the upper shoe at one end thereof and extending across the groove therein, a bridge member connected with the upper shoe at the opposite end thereof and extending across the groove therein, and means for moving one of the last said bridge members toward the upper shoe to clamp the upper tools within the groove in the upper shoe.

30. In a machine for making a brush element of the strip type, the combination of means for moving an initially flat strip of metal longitudinally through successive zones, means at one zone for forming the side portions of the strip so as to provide longitudinally spaced pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, and two devices at another zone and at opposite sides of the strip for additionally bending the strip along longitudinal lines so as to bring the socket sections of successive pairs into closed relationship and so as to complete the folding of the bunches of fibers, the device at one side of the strip being constructed to serve at one portion of the last said zone for moving each successive socket section at the said side beyond the central plane and the device at the opposite side of the strip being constructed to serve at a leading portion of the last said zone for moving each successive socket section at the last said side at least to the central plane and into firm engagement with its mating socket section which has previously been moved beyond the central plane.

31. In a machine for making a brush element of the strip type, the combination of means for moving an initially flat strip of metal longitudinally through successive zones, means at one zone for forming the side portions of the strip so as to provide longitudinally spaced pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spacing bunches of transverse fibers positioned below the wire, the last said means causing the bunches of fibers to be partly folded into the successive pairs of socket sections, and two devices at another zone and at opposite sides of the strip for additionally bending the strip along longitudinal lines so as to bring the socket sections of successive pairs into closed relationship and so as to complete the folding of the bunches of fibers, the said strip bending devices being constructed to serve at one portion of the last said zone for moving the socket section at one side of each successive pair beyond the central plane and for moving the socket section at the other side of the said pair to a lesser extent and the said strip bending device at the last said side being further constructed to serve at a leading portion of the last said zone for moving each successive socket section at the corresponding side at least to the central plane and into firm engagement with its mating socket section which has previously been moved beyond the central plane.

32. In a machine for making a brush element of the strip type, the combination of means for intermittently moving an initially flat strip of metal longitudinally through successive zones, opposed relatively reciprocating dies at one zone for forming the side portions of the strip so as to provide longitudinally spaced pairs of oppositely disposed transversely extending concave socket sections and so as to provide pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, two jaws at another zone and at opposite sides of the strip, and means for oppositely reciprocating the two jaws in synchronism with the intermittent feeding of the strip to engage the jaws with the socket sections of the strip, the said jaws serving to additionally bend the strip along longitudinal lines so as to bring the socket sections of successive pairs into closed relationship and so as to complete the folding of the bunches of fibers.

33. In a machine for making a brush element of the strip type, the combination of means for intermittently moving an initially flat strip of metal longitudinally through successive zones, opposed relatively reciprocating dies at one zone for forming the side portions of the strip so as to provide longitudinally spaced pairs of oppositely disposed transversely extending concave socket sections and so as to provide pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, two jaws at another zone and at opposite sides of the strip, and means for oppositely reciprocating the two jaws in synchronism with the intermittent feeding of the strip to engage the jaws with the socket sections of the strip, the jaw at one side of the strip and the reciprocating means therefor being constructed to serve at one portion of the last said zone for moving each successive socket section at the said side beyond the central plane and the jaw at the opposite side of the strip and the reciprocating means therefor being constructed to serve at a leading portion of the last said zone for moving each successive section at the last said side at least to the central plane and into firm engagement with its mating socket section which has previously been moved beyond the central plane.

34. In a machine for making a brush element of the strip type, the combination of means for intermittently moving an initially flat strip of metal longitudinally through successive zones, opposed relatively reciprocating dies at one zone for forming the side portions of the strip so as to provide longitudinally spaced pairs of oppositely disposed transversely extending concave socket sections and so as to provide pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, two jaws at another zone and at opposite sides of the strip, and means for oppositely reciprocating the two jaws in synchronism with the intermittent feeding of the strip to engage the jaws with the strip, the jaw at one side of the strip and the reciprocating means therefor being constructed to serve at one portion of the last said zone for moving each successive socket section at the said side beyond the central plane and the device at the opposite side of the strip being constructed to serve at a leading portion of the last said zone for moving each successive section at the last said side at least to the central plane and into firm engagement with its mating socket section which has previously been moved beyond the central plane.

35. In a machine for making a brush element of the strip type, the combination of means for intermittently moving an initially flat strip of metal longitudinally through successive zones, opposed relatively reciprocating dies at one zone for forming the side portions of the strip so as to provide longitudinally spaced pairs of oppositely disposed transversely extending concave socket sections and so as to provide pairs of oppositely disposed transversely extending concave socket sections and so as to provide pairs of oppositely disposed forwardly offset sections which are between the pairs of socket sections, means at another zone for bending the strip upward along longitudinal lines to provide an open-front channel, means at another zone for intermittently feeding into the channel of the strip a longitudinal wire and longitudinally spaced bunches of transverse fibers positioned below the wire, the last said means causing the bunches of fibers to be partly folded into the successive pairs of socket sections, two jaws at another zone and at opposite sides of the strip, means for oppocsitely reciprocating the two jaws in synchronism with the intermittent feeding of the strip to engage the jaws with the strip, the said jaws serving to additionally bend the strip along longitudinal lines so as to bring the socket sections of successive pairs into closed relationship and so as to complete the folding of the bunches of fibers, and transversely extending fingers on the respective jaws located and spaced to move between the several bunches of fibers as the jaws are moved toward each other, the said fingers serving to hold the fibers in their forwardly extending positions during movement of the socket sections into closed relationship.

ROBERT W. VOSE.
ERNEST D. HARGREAVES.

REFERENCES CITED

The following references are of record in the file of this patent:

UNITED STATES PATENTS

| Number | Name | Date |
|---|---|---|
| 1,826,267 | White | Oct. 6, 1931 |
| 2,169,802 | Keller | Aug. 15, 1939 |
| 2,271,835 | Cave | Feb. 3, 1942 |
| 2,409,147 | Neuhaus | Oct. 8, 1946 |